(12) United States Patent
Qiao et al.

(10) Patent No.: US 11,630,534 B2
(45) Date of Patent: Apr. 18, 2023

(54) WIRING STRUCTURE, MANUFACTURING METHOD THEREOF, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Yun Qiao, Beijing (CN); Zhen Wang, Beijing (CN); Xiaozhou Zhan, Beijing (CN); Han Zhang, Beijing (CN); Wenwen Qin, Beijing (CN); Peng Liu, Beijing (CN); Zhengkui Wang, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 481 days.

(21) Appl. No.: 16/476,621

(22) PCT Filed: Jan. 10, 2019

(86) PCT No.: PCT/CN2019/071127
§ 371 (c)(1),
(2) Date: Jul. 9, 2019

(87) PCT Pub. No.: WO2019/174387
PCT Pub. Date: Sep. 19, 2019

(65) Prior Publication Data
US 2021/0357094 A1    Nov. 18, 2021

(30) Foreign Application Priority Data
Mar. 12, 2018 (CN) .......................... 201810201134.8

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 3/0412* (2013.01); *G06F 2203/04103* (2013.01)

(58) Field of Classification Search
None
See application file for complete search history.

(56) References Cited

U.S. PATENT DOCUMENTS

2011/0085122 A1* 4/2011 Fu ........................ G02F 1/13452
345/55
2016/0370904 A1* 12/2016 Wang .................... G06F 3/0416
(Continued)

FOREIGN PATENT DOCUMENTS

CN          105224135 A      1/2016
CN          105575994 A      5/2016
(Continued)

OTHER PUBLICATIONS

Second Office Action for Chinese Patent Application No. 201810201134.8 dated Feb. 25, 2020.
First Office Action for Chinese Patent Application No. 201810201134.8 dated May 8, 2019.
Search Report and Written Opinion for International Application No. PCT/CN2019/071127 dated Mar. 27, 2019.
(Continued)

*Primary Examiner* — Stephen T. Reed
(74) *Attorney, Agent, or Firm* — Calfee, Halter & Griswold LLP

(57) ABSTRACT

A wiring structure includes a plurality of first connection lines disposed in a first wiring layer and extending respectively from first ones of the plurality of first electrical contacts to first ones of the plurality of second electrical
(Continued)

contacts, the first connection lines not intersecting each other; and a plurality of second connection lines disposed in a second wiring layer and extending respectively from second ones of the plurality of first electrical contacts to second ones of the plurality of second electrical contacts, the second connection lines not intersecting each other. An orthographic projection of any one of the first connection lines onto a plane parallel to the first and second wiring layers does not intersect an orthographic projection of any one of the second connection lines onto the plane.

12 Claims, 5 Drawing Sheets

(56) References Cited

U.S. PATENT DOCUMENTS

| | | |
|---|---|---|
| 2017/0102795 A1 | 4/2017 | Wang et al. |
| 2017/0185179 A1 | 6/2017 | Shao et al. |
| 2018/0173346 A1* | 6/2018 | Du .................. H01L 27/124 |
| 2018/0188867 A1* | 7/2018 | Yeh .................. G06F 3/0443 |
| 2019/0212855 A1 | 7/2019 | Shang |

FOREIGN PATENT DOCUMENTS

| | | |
|---|---|---|
| CN | 106557190 A | 4/2017 |
| CN | 106653722 A | 5/2017 |
| CN | 106775124 A | 5/2017 |
| CN | 206178748 U | 5/2017 |
| CN | 106959783 A | 7/2017 |
| CN | 107037646 A | 8/2017 |
| CN | 107121860 A | 9/2017 |
| CN | 107479283 A | 12/2017 |
| CN | 107544697 A | 1/2018 |
| CN | 107656646 A | 2/2018 |
| CN | 108415601 A | 8/2018 |
| CN | 107479283 B | 7/2020 |

OTHER PUBLICATIONS

Communication from European Patent Application 19767947.5 dated Nov. 19, 2021.

Notice of Hearing Communication from Indian Application No. 202047027722 dated Oct. 27, 2022.

* cited by examiner

WIRING STRUCTURE, MANUFACTURING METHOD THEREOF, AND DISPLAY DEVICE

CROSS-REFERENCE TO RELATED APPLICATIONS

The present application is a 35 U.S.C. 371 national stage application of PCT International Application No. PCT/CN2019/071127, filed on Jan. 10, 2019, which claims priority to Chinese Patent Application No. 201810201134.8 filed on Mar. 12, 2018, the entire disclosure of which is incorporated herein by reference.

TECHNICAL FIELD

The present disclosure relates to the field of display technologies, and in particular, to a wiring structure, a method of manufacturing the wiring structure, and a display device.

BACKGROUND

With the increasing popularity of the bezel-less screen concept, the narrow bezel design of portable electronic devices such as mobile phones has received wide attention. Touch and Display Driver Intergation (TDDI) facilitates the implementation of a narrow bezel by integrating touch driver circuitry and display driver circuitry into a single driver chip. However, in current TDDI products, there are often undesired intersections in the wiring between the driver chip and the touch display panel.

SUMMARY

According to some exemplary embodiments of the present disclosure, a wiring structure is provided for connecting a plurality of first electrical contacts to respective ones of a plurality of second electrical contacts, the plurality of first electrical contacts being arranged in a straight line over a first span, the plurality of second electrical contacts being arranged in a straight line over a second span, the second span being less than the first span. The wiring structure comprises: a plurality of first connection lines in a first wiring layer, wherein the plurality of first connection lines extend respectively from first ones of the plurality of first electrical contacts to first ones of the plurality of second electrical contacts and do not intersect each other; and a plurality of second connection lines in a second wiring layer, wherein the plurality of second connection lines extend respectively from second ones of the plurality of first electrical contacts to second ones of the plurality of second electrical contacts and do not intersect each other. An orthographic projection of any one of the first connection lines onto a plane parallel to the first and second wiring layers does not intersect an orthographic projection of any one of the second connection lines onto the plane.

In some embodiments, the plurality of first connection lines and the plurality of second connection lines are arranged such that the first connection lines and the second connection lines alternate with each other when viewed from a direction perpendicular to the first and second wiring layers.

In some embodiments, the first and second connection lines that alternate with each other are divided into a plurality of first groups configured to transfer a first type of signals and a plurality of second groups configured to transfer a second type of signals, and the first groups and the second groups alternate with each other.

In some embodiments, the plurality of first groups each comprise at least one of the first connection lines and at least one of the second connection lines, and the plurality of second groups each comprise at least one of the first connection lines and at least one of the second connection lines.

In some embodiments, the plurality of first groups each comprise at least one of the first connection lines and at least one of the second connection lines, and the plurality of second groups each comprise one of the first connection lines or one of the second connection lines.

In some embodiments, the first connection lines are different in quantity from the second connection lines.

In some embodiments, the first connection lines and the second connection lines are metal lines.

In some embodiments, the wiring structure further comprises an insulating layer between the first wiring layer and the second wiring layer.

According to some exemplary embodiments of the present disclosure, a method of manufacturing a wiring structure is provided. The wiring structure is for connecting a plurality of first electrical contacts to respective ones of a plurality of second electrical contacts, the plurality of first electrical contacts being arranged in a straight line over a first span, the plurality of second electrical contacts being arranged in a straight line over a second span, the second span being less than the first span. The method comprises: forming in a first wiring layer a plurality of first connection lines that extend respectively from first ones of the plurality of first electrical contacts to first ones of the plurality of second electrical contacts, wherein the first connection lines do not intersect each other; and forming in a second wiring layer a plurality of second connection lines that extend respectively from second ones of the plurality of first electrical contacts to second ones of the plurality of second electrical contacts, wherein the second connection lines do not intersect each other. An orthographic projection of any one of the first connection lines onto a plane parallel to the first and second wiring layers does not intersect an orthographic projection of any one of the second connection lines onto the plane.

According to some exemplary embodiments of the present disclosure, a display device is provided comprising the wiring structure as described above.

In some embodiments, the display device further comprises: a touch display panel comprising touch signal lines and display signal lines; and a driver integrated with a touch driving circuit and a display driving circuit, wherein the driver comprises a bonding area and a plurality of first pins and a plurality of second pins in the bonding area, the first pins are configured to supply display signals, the second pins are configured to supply touch signals, and the first pins and the second pins are arranged in a straight line in the bonding area. The display signal lines are connected to the first pins via the wiring structure. The touch signal lines are connected to the second pins via the wiring structure.

In some embodiments, the display device further comprises a glass substrate carrying the driver.

In some embodiments, the display device further comprises a thin film substrate carrying the driver.

In some embodiments, the touch display panel is a self-capacitive touch display panel.

In some embodiments, the touch display panel is a mutual capacitive touch display panel.

These and other exemplary embodiments of the present disclosure will be apparent from and elucidated with reference to the embodiment(s) described hereinafter.

BRIEF DESCRIPTION OF THE DRAWINGS

Further details, features and advantages of the present disclosure are disclosed in the following description of exemplary embodiments in conjunction with the accompanying drawings in which.

Figure 1:
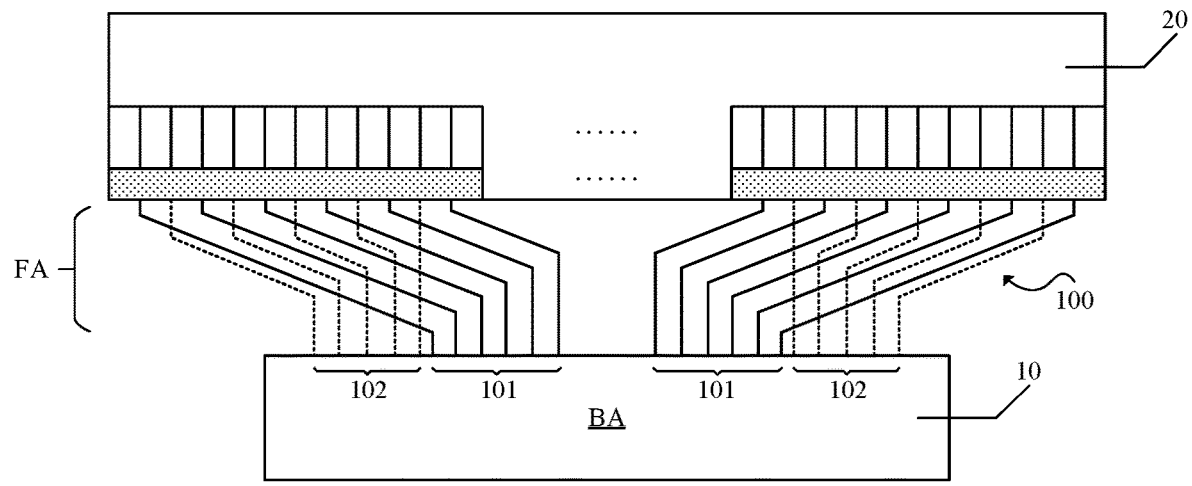
FIG. 1 is a schematic view showing a typical wiring structure in a fan-out area of a TDDI product.

The figures are not necessarily drawn to scale, and the same reference sign refers to the same element throughout.

DETAILED DESCRIPTION

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a schematic view showing a typical wiring structure 100 in a fan-out area of a TDDI product.

Referring to FIG. 1, in a fan-out area FA of a touch display panel 20, display signal connection lines 101 are connected to a driver chip 10 in the middle of a bonding area BA of the driver chip 10, and touch signal connection lines 102 are connected to the driver chip 10 on both sides of the bonding area BA of the driver chip 10. The display signal connection lines 101 and the touch signal connection lines 102 are typically wired in different metal layers, and thus are indicated in the figure by solid lines and dashed lines, respectively. Such a wiring approach may result in an intersection between orthographic projections of the display signal connection lines 101 and those of the touch signal connection lines 102 onto the circuit board on which they are carried, thereby generating parasitic capacitance that affects the touch performance. In addition, this wiring approach leads to a large footprint of the connection lines 101 and 102, which is disadvantageous for achieving a narrow bezel design.

Figure 2:
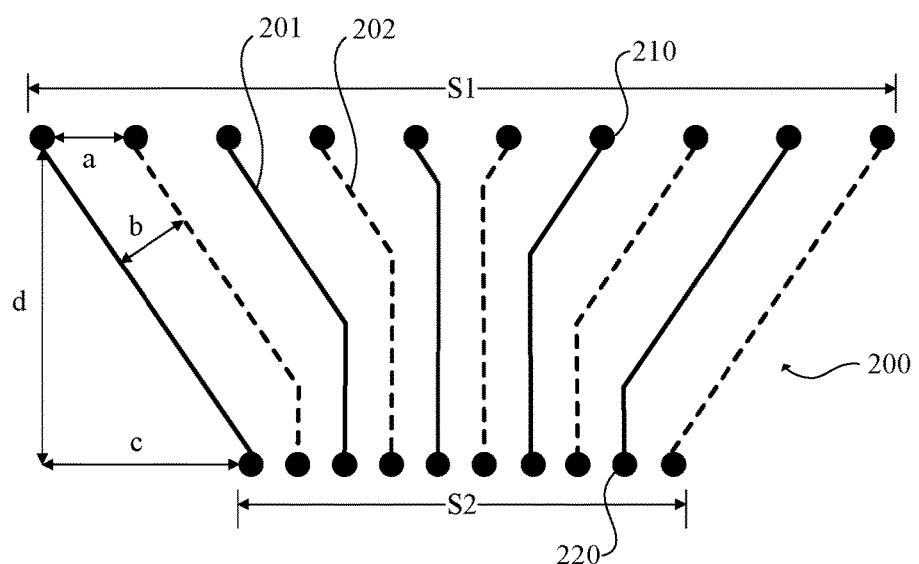
FIG. 2 is a schematic view generally showing a wiring structure according to an exemplary embodiment of the present disclosure.

FIG. 2 is a schematic view generally showing a wiring structure 200 according to an exemplary embodiment of the present disclosure.

Referring to FIG. 2, the wiring structure 200 includes a plurality of first connection lines 201 and a plurality of second connection lines 202, which connect a plurality of first electrical contacts 210 to respective ones of a plurality of second electrical contacts 220. The plurality of first electrical contacts 210 are arranged in a straight line over a first span S1, and the plurality of second electrical contacts 220 are arranged in a straight line over a second span S2, with the second span S2 being less than the first span S1.

The first connection lines 201, indicated by solid lines, are disposed in a first wiring layer (not shown) and extend respectively from first ones of the plurality of first electrical contacts 210 to first ones of the plurality of second electrical contacts 220. The first connection lines 201 do not intersect each other. The second connection lines 202, indicated by dashed lines, are disposed in a second wiring layer (not shown) and extend respectively from second ones of the plurality of first electrical contacts 210 to second ones of the plurality of second electrical contacts 220. The second connection lines 202 do not intersect each other. An orthographic projection of any one of the first connection lines 201 onto a plane parallel to the first and second wiring layers (i.e., the paper plane in the example of FIG. 2) does not intersect an orthographic projection of any one of the second connection lines 202 onto the plane. Further, the number of the first connection lines 201 and the number of the second connection lines 202 may be the same or different. Typically, the first connection lines 201 and the second connection lines 202 may be made of metal such as copper, aluminum, silver or alloys thereof. This provides good electrical conductivity and process compatibility.

In FIG. 2, the first electrical contacts 210 are illustrated as being disposed parallel to the second electrical contacts 220, although other embodiments are possible. Parameter a represents a pitch between the first electrical contacts 210, parameter b represents a pitch between the directly adjacent connection lines 201 and 202 (when viewed from above), the magnitude of which is related to the process capability, parameter c is a horizontal distance between the first one of the first electrical contacts 210 and the first one of the second electrical contacts 220, and parameter d represents the size of the footprint of the connection lines 201 and 202.

It can be derived from the illustrated arrangement that:

$$c/d = \sqrt{a^2 - b^2}/b; \text{ and}$$

parameter d can then be calculated as follows:

$$d = bc/\sqrt{a^2 - b^2}.$$

Given the parameters a and b, the size d of the footprint is proportional to parameter c. The wiring structure 200 can provide a reduced footprint of the connection lines compared with the wiring structure 100 in FIG. 1. This is because the connection lines 201 and 202 now do not need to be concentrated in the middle of the bonding area BA as in FIG. 1, and therefore parameter c can be significantly reduced.

Advantageously, in an application scenario such as the TDDI product of FIG. 1, the wiring structure 200 can enable a smaller bezel, increasing the space utilization of the touch display panel. In addition, since the first connection lines 201 and the second connection lines 202 do not intersect each other, the parasitic capacitance caused by the connection lines is effectively reduced, thereby improving the sensitivity and accuracy of the touch operation of the touch display panel.

Figure 3:
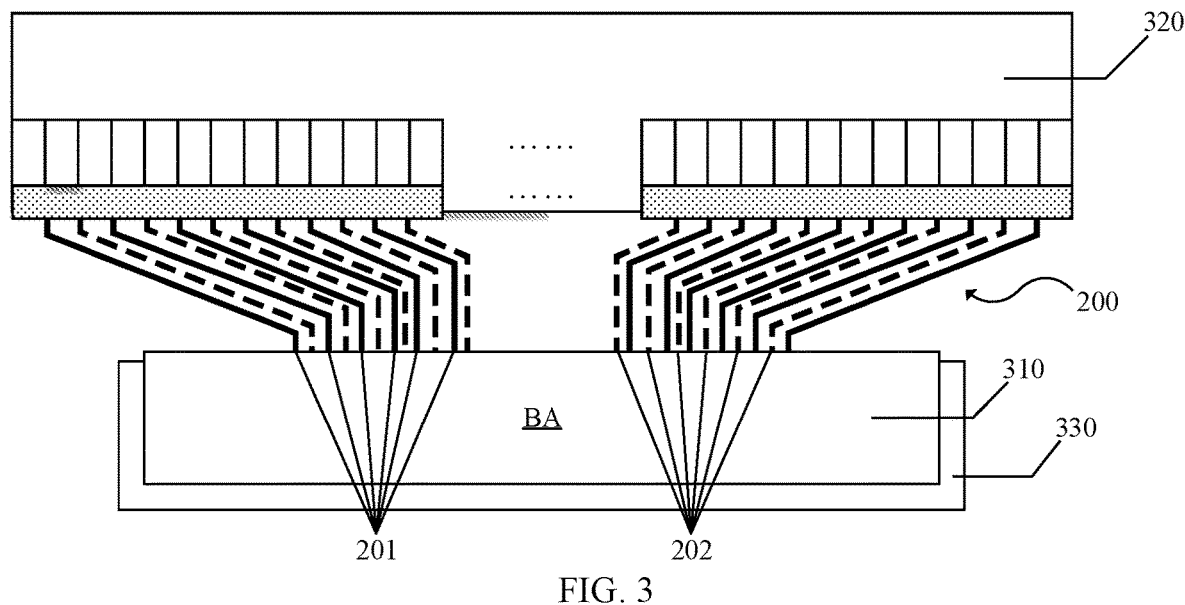
FIG. 3 is a schematic view showing a display device in which a wiring structure according to an exemplary embodiment of the present disclosure may be applied.

FIG. 3 shows a schematic view of a display device 300 in which the wiring structure 200 can be applied. By way of example and not limitation, the display device 300 includes a cell phone, a tablet, a television, a notebook, a digital photo frame, a navigator, or the like.

Referring to FIG. 3, the display device 300 includes a touch display panel 320, a driver 310, and the wiring structure 200 disposed between the touch display panel 320 and the driver 310. The touch display panel 320 may be a self-capacitive touch display panel or a mutual capacitive touch display panel. Touch signal lines (not shown) and display signal lines (not shown) in the touch display panel 320 are connected, via the wiring structure 200, to corresponding ones of the pins (not shown) of the driver 310 disposed in the bonding area BA of the driver 310. In this embodiment, the driver 310 is a TDDI driver integrated with a touch driving circuit and a display driving circuit. The driver 310 may be implemented as a single driver chip or alternatively may include multiple driver chips.

The display device 300 further includes a substrate 330 on which the driver 310 is carried. Depending on how the driver 310 is implemented on the substrate 330, the wiring structure 200 may take different forms. In embodiments where the substrate 330 is a glass substrate, the wiring structure 200 is adapted to a chip on glass (COG) solution. In embodiments where the substrate 330 is a thin film substrate, the wiring structure 200 is adapted to a chip on film (COF) solution. For the COG solution, the wiring structure 200 allows the bezel size to be reduced by not less than 0.5 mm compared with the wiring structure 100. For the COF solution, it may even be possible to make the fan-out area not affect the bottom bezel, thus facilitating the realization of a bezel-less screen.

Figure 4:
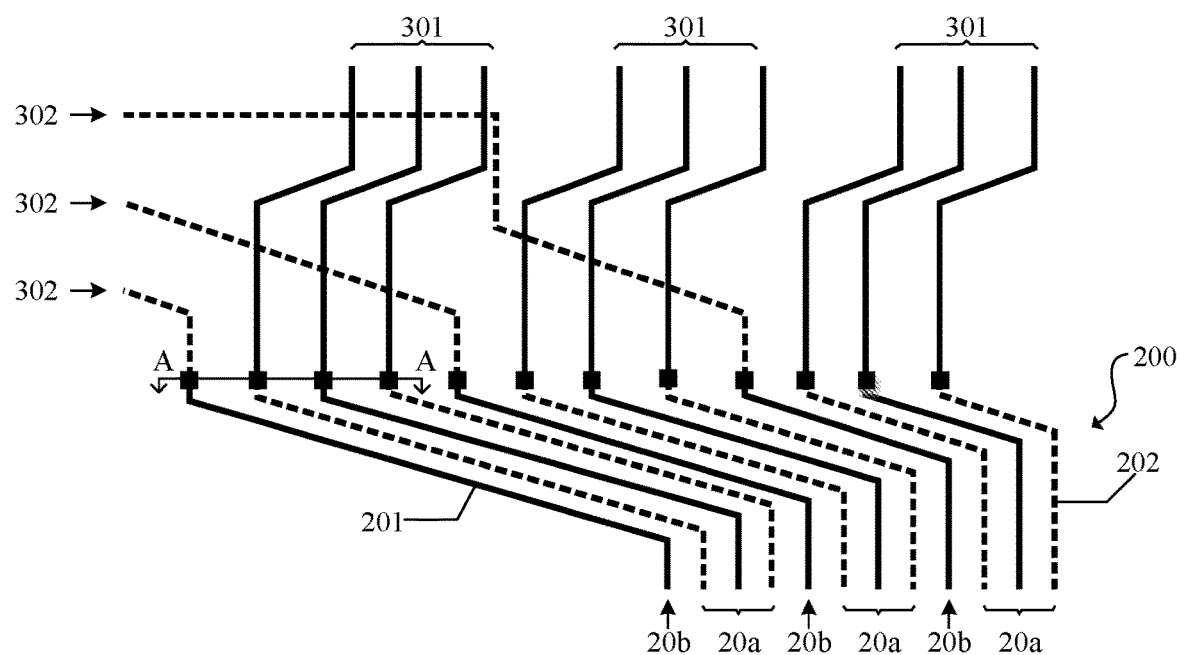
FIG. 4 schematically shows the connection relationship between the connection lines and the signal lines in FIG. 3 in an enlarged view.

FIG. 4 schematically shows the connection relationship between the connection lines and the signal lines in FIG. 3 in an enlarged view.

Referring to FIG. 4, a plurality of display signal lines 301 and a plurality of touch signal lines 302 are connected to respective ones of the first connection lines 201 or second connection lines 202, with the connection points (indicated by squares) serving as the first electrical contacts 210 in FIG. 2. The first connection lines 201 are disposed in the same layer as the display signal lines 301 (both indicated by solid lines), and the second connection lines 202 are disposed in the same layer as the touch signal lines 302 (both indicated by dashed lines).

In the example of FIG. 4, the plurality of first connection lines 201 and the plurality of second connection lines 202 are arranged such that when viewed from a direction perpendicular to the first and second wiring layers (i.e., a direction perpendicular to the paper plane in the figure) the first connection lines 201 and the second connection lines 202 alternate with each other. Further, the alternating first and second connection lines 201 and 202 are divided into a plurality of first groups 20a configured to transfer a first type of signals (display signals in this example) and a plurality of second groups 20b configured to transfer a second type of signals (touch signals in this example), with the first groups 20a and the second groups 20b alternating with each other. Specifically, the connection lines 201 and 202 in the first groups 20a are connected to respective ones of the display signal lines 301, and the connection lines 201 and 202 in the second groups 20b are connected to respective ones of the touch signal lines 302. In this example, the plurality of first groups 20a each include one first connection line 201 and two second connection lines 202, and the plurality of second groups 20b each include one first connection line 201. In other embodiments, the first group 20a and the second group 20b may include more or fewer first connection lines 201 and/or more or fewer second connection lines 202. This provides an alternative wiring design that enables adaptation to the specifications of the touch display panel and the driver.

Figure 5:
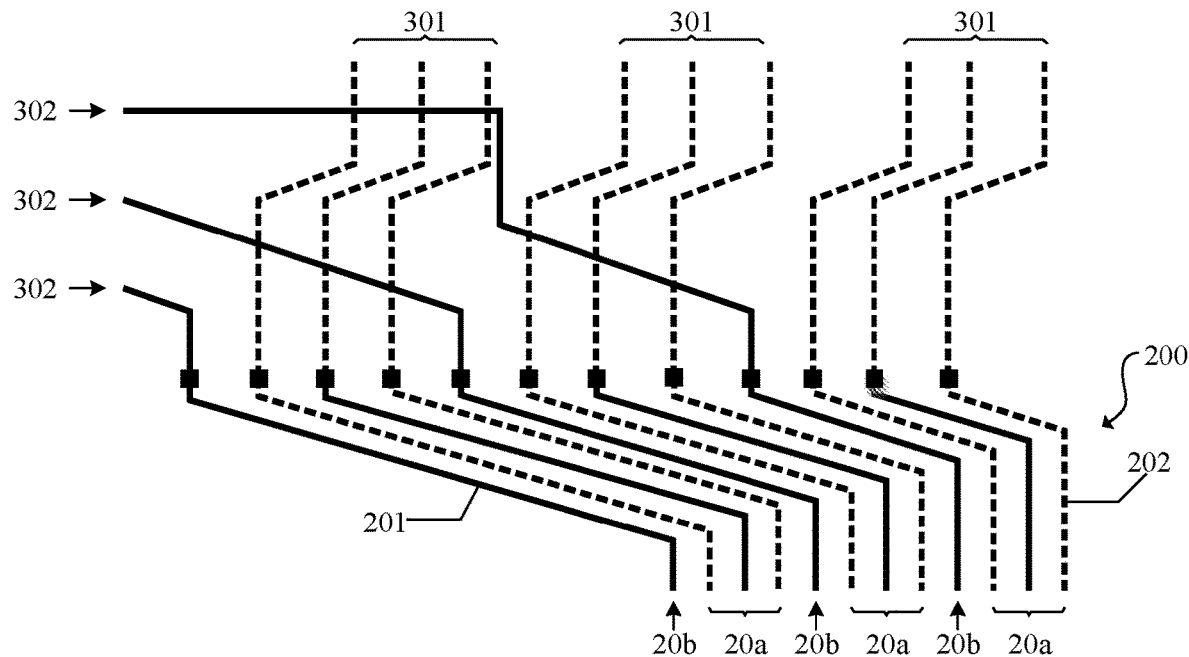
FIG. 5 schematically shows a variation of the connection relationship shown in FIG. 4 in an enlarged view.

FIG. 5 schematically shows a variation of the connection relationship shown in FIG. 4 in an enlarged view. In this embodiment, the first connection lines 201 are disposed in the same layer as the touch signal lines 302 (both indicated by solid lines), and the second connection lines 202 are disposed in the same layer as the display signal lines 301 (both indicated by dashed lines). This provides an alternative wiring design that enables adaptation to the specifications of the touch display panel and the driver.

Figure 6:
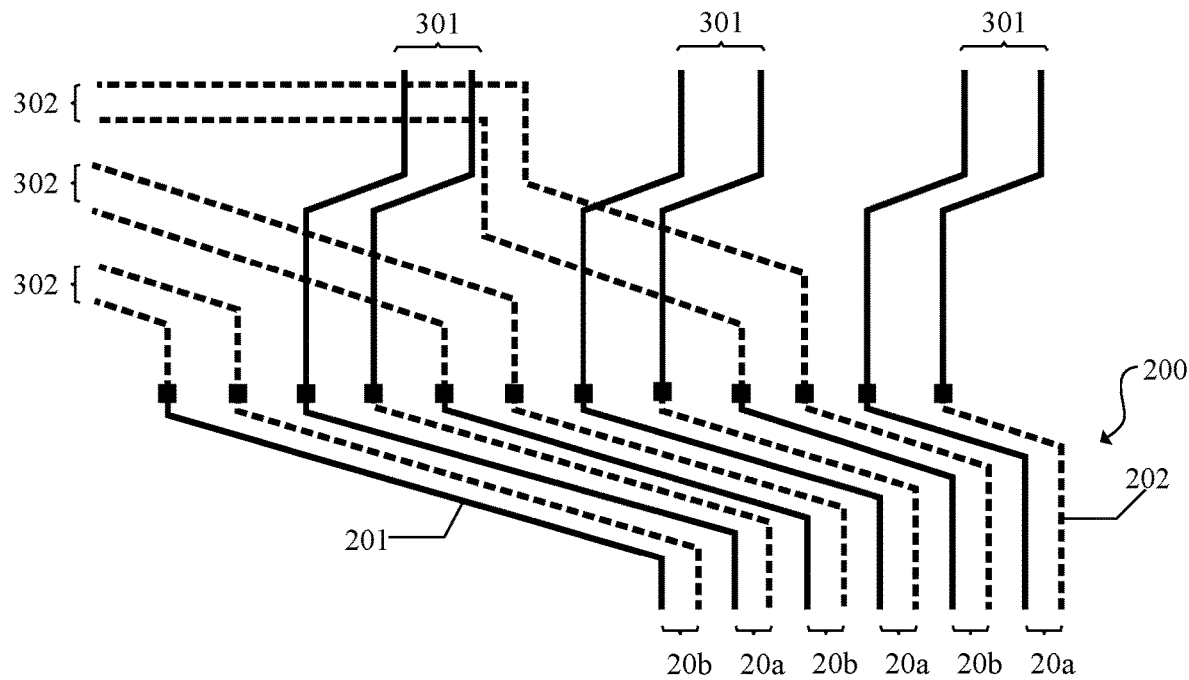
FIG. 6 schematically shows another variation of the connection relationship shown in FIG. 4 in an enlarged view.

FIG. 6 schematically shows another variation of the connection relationship shown in FIG. 4 in an enlarged view. As previously described, the alternating first and second connection lines 201 and 202 are divided into a plurality of first groups 20a configured to transfer a first type of signals (e.g., display signals) and a plurality of second groups 20b configured to transfer a second type of signals (e.g., touch signals). In this example, the plurality of first groups 20a each include one first connection line 201 and one second connection line 202, and the plurality of second groups 20b each also include one first connection line 201 and one second connection line 202. In other embodiments, the first group 20a and the second group 20b may include more or fewer first connection lines 201 and/or more or fewer second connection lines 202. This provides an alternative wiring design that enables adaptation to the specifications of the touch display panel and the driver.

Figure 7:
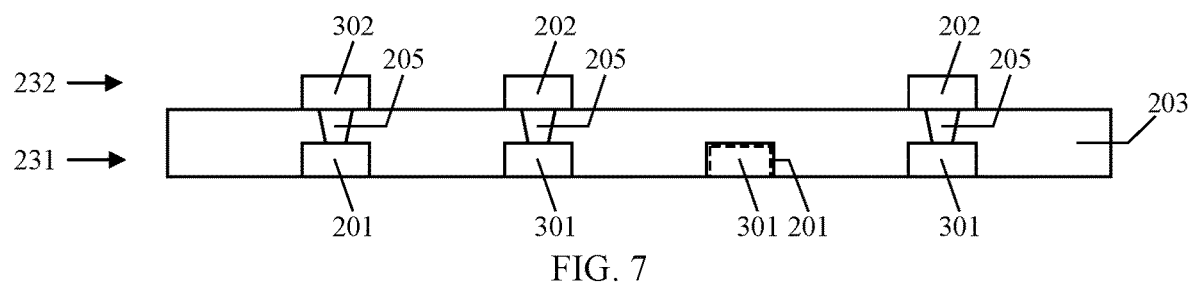
FIG. 7 is a cross-sectional view taken along line A-A in FIG. 4.

FIG. 7 is a cross-sectional view taken along line A-A in FIG. 4, showing the electrical connections between the signal lines 301, 302 and the connection lines 201, 202.

As shown in FIG. 7, three display signal lines 301 and two first connection lines 201 are disposed in a first wiring layer 231, and one touch signal line 302 and two second connection lines 202 are disposed in a second wiring layer 232. An insulating layer 203 is disposed between the first wiring layer 231 and the second wiring layer 232 to provide electrical insulation. The electrical connection between the first wiring layer 231 and the second wiring layer 232 is provided by vias 205 disposed in the insulating layer 203.

The electrical connections between the signal lines and the connection lines are described in the direction from left to right in the figure. In the first pair of signal line and connection line, the first connection line 201 in the first wiring layer is connected to the touch signal line 302 in the second wiring layer 232 through the via 205. In the second pair of signal line and connection line, the second connection line 202 in the second wiring layer 232 is connected to the display signal line 301 in the first wiring layer 231 through the via 205. In the third pair of signal line and connection line, the first connection line 201 in the first wiring layer 231 is connected to the display signal line 301 in the first wiring layer 231, with no need for the via. In the fourth pair of signal line and connection line, the second connection line 202 in the second wiring layer 232 is connected to the display signal line 301 in the first wiring layer 231 through the via 205. In this way, the electrical connection between the touch display panel 320 and the wiring structure 200 (FIG. 3) is achieved without the connection lines 201 and 202 intersecting.

Depending on the arrangement of the display signal lines 301 and the touch signal lines 302 in the touch display panel 320, the arrangement of the pins in the bonding area BA (FIG. 3) of the driver chip 310 can be adjusted accordingly.

Figure 8:
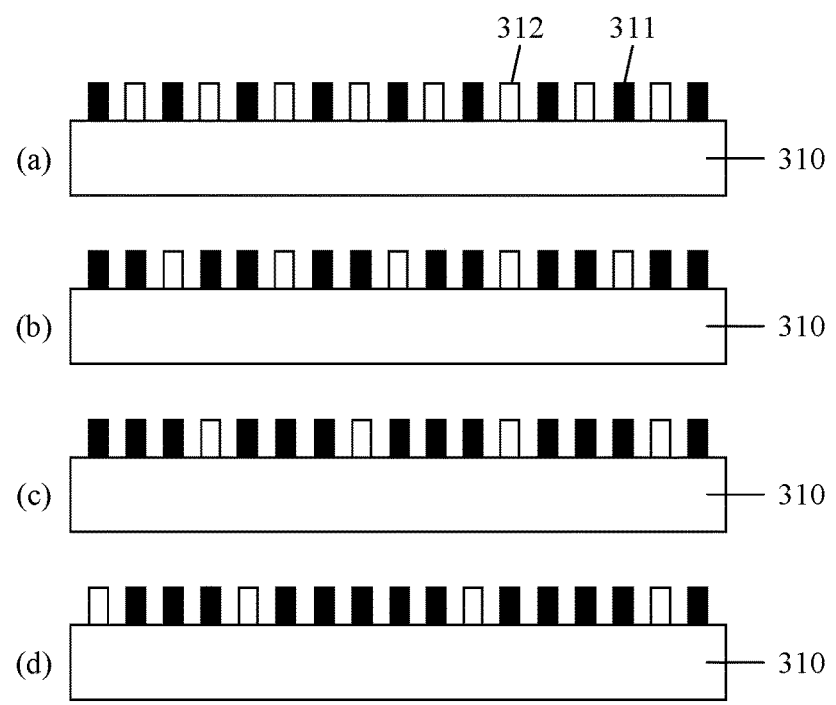
FIG. 8 is a schematic view showing various pin arrangements of a TDDI driver used in cooperation with a wiring structure according to an exemplary embodiment of the present disclosure.

FIG. 8 shows various arrangements of the pins of a TDDI driver 310 for use in cooperation with a wiring structure in accordance with an exemplary embodiment of the present disclosure. As shown in FIG. 8, the bonding area BA of the driver chip 310 includes a plurality of first pins 311 for supplying display signals and a plurality of second pins 312 for supplying touch signals. In the example (a), the first pins 311 and the second pins 312 are alternately arranged. In the example (b), a second pin 312 is provided every two directly adjacent first pins 311. In the example (c), a second pin 312 is provided every three directly adjacent first pins 311. In the example (d), the plurality of second pins 312 are interspersed among the plurality of first pins 311.

Figure 9:
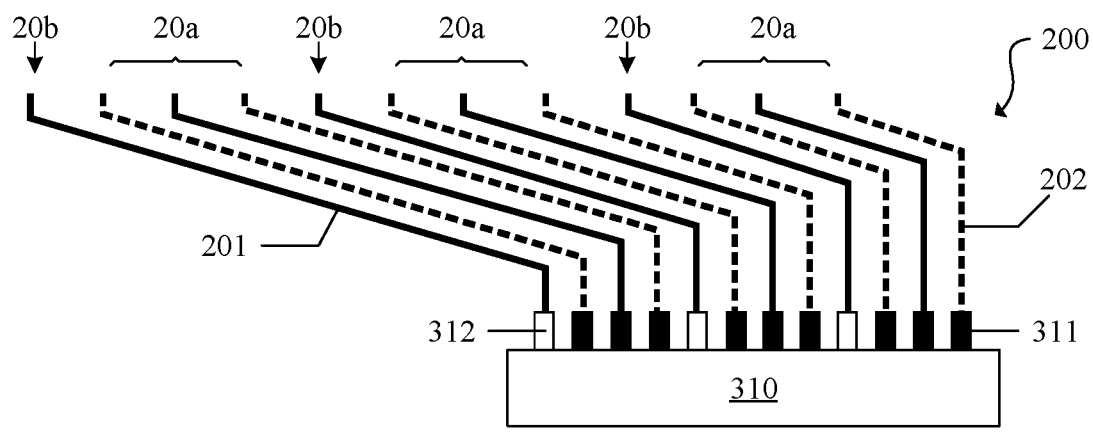
FIG. 9 is a schematic view showing a connection relationship between a wiring structure according to an exemplary embodiment of the present disclosure and a TDDI driver.

FIG. 9 shows an example connection relationship between the wiring structure 200 and the TDDI driver 310. As shown in FIG. 9, the first pins 311 are connected to the first groups of connection lines 20a for the display signal lines, and the second pins 312 are connected to the second connection lines 20b for touch signal lines. It will be understood that the connection relationship shown in FIG. 9 is exemplary and that other embodiments are possible.

Figure 10:
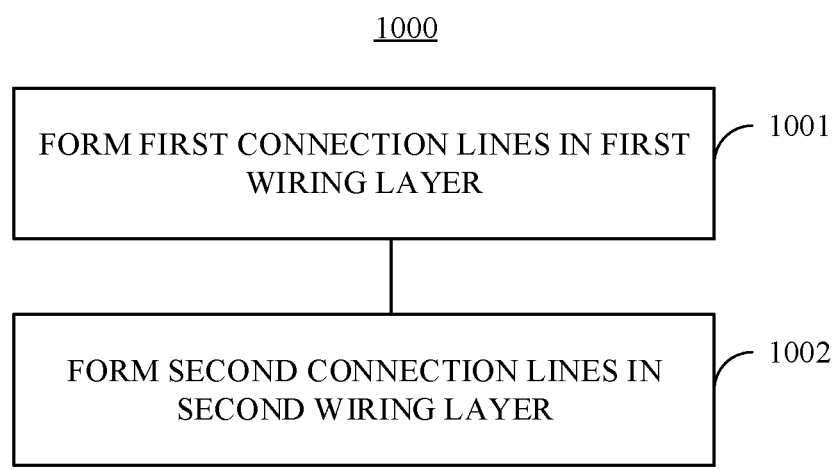
FIG. 10 is a flow chart showing a method of manufacturing a wiring structure according to an exemplary embodiment of the present disclosure.

FIG. 10 is a flow chart showing a method 1000 of manufacturing a wiring structure in accordance with an exemplary embodiment of the present disclosure. As described above, the wiring structure is for connecting a plurality of first electrical contacts to respective ones of a plurality of second electrical contacts, the plurality of first electrical contacts are arranged along a straight line over a first span, the plurality of second electrical contacts are arranged along a straight line over a second span, and the second span is less than the first span.

At step 1001, a plurality of first connection lines are formed in the first wiring layer that extend respectively from first ones of the plurality of first electrical contacts to first ones of the plurality of second electrical contacts, with the first connection lines not intersecting each other. At step 1002, a plurality of second connection lines are formed in the second wiring layer that extend respectively from second ones of the plurality of first electrical contacts to second ones of the plurality of second electrical contacts, with the second connection lines not intersecting each other. An orthographic projection of any one of the first connection lines onto a plane parallel to the first and second wiring layers does not intersect an orthographic projection of any one of the second connection lines onto the plane.

The details of the wiring structure embodiments described above with respect to FIGS. 2 to 9 apply to the method 1000, and the method 1000 can provide the same advantages accordingly, which will not be repeated herein.

Although the various steps of the method of the present disclosure are described in a particular order in the figures, this is not to be construed as requiring or implying that the steps should be performed in the specific order, or that all the steps shown should be performed to achieve the desired result. Additionally or alternatively, certain steps may be omitted, multiple steps may be combined into one step for execution, and/or one step may be decomposed into multiple steps for execution, and the like.

Other embodiments of the present disclosure will be apparent to those skilled in the art after considering the specification and practicing the present disclosure. The present application is intended to cover any variations, uses, or adaptations of the present disclosure, which variations, uses, or adaptations are in accordance with the general principles of the disclosure and include common knowledge or common technical means in the art that are not disclosed in the present disclosure. The described embodiments and the illustrated figures are to be considered as exemplary only, and the scope of the disclosure is defined by the claims.

What is claimed is:

1. A wiring structure for connecting a plurality of first electrical contacts to respective ones of a plurality of second electrical contacts, the plurality of first electrical contacts being arranged in a first straight line over a first span, the plurality of second electrical contacts being arranged in a second straight line over a second span, the first straight line being parallel to the second straight line and the second span being less than the first span, the wiring structure comprising:
    a plurality of first connection lines in a first wiring layer, wherein the plurality of first connection lines extend respectively from first ones of the plurality of first electrical contacts to first ones of the plurality of second electrical contacts and do not intersect each other; and
    a plurality of second connection lines in a second wiring layer, wherein the plurality of second connection lines extend respectively from second ones of the plurality of first electrical contacts to second ones of the plurality of second electrical contacts and do not intersect each other,
    wherein an orthographic projection of any one of the first connection lines onto a plane parallel to the first and second wiring layers does not intersect an orthographic projection of any one of the second connection lines onto the plane,
    wherein the plurality of first connection lines and the plurality of second connection lines are arranged such that the first connection lines and the second connection lines alternate with each other when viewed from a direction perpendicular to the first and second wiring layers,
    wherein the first and second connection lines that alternate with each other are divided into a plurality of first groups configured to transfer a first type of signals and a plurality of second groups configured to transfer a second type of signals, and the first groups and the second groups alternate with each other,
    wherein the plurality of first groups each comprise at least one of the first connection lines and at least one of the second connection lines, and the plurality of the second groups each comprise at least one of the first connection lines and at least one of the second connection lines, or
    wherein the plurality of first groups each comprise at least one of the first connection lines and at least one of the second connection lines, and the plurality of second groups each comprise a respective one of the first connection lines or the second connection lines.

2. The wiring structure of claim 1, wherein the first connection lines are different in quantity from the second connection lines.

3. The wiring structure of claim 1, wherein the first connection lines and the second connection lines comprise metal lines.

4. The wiring structure of claim 1, further comprising an insulating layer between the first wiring layer and the second wiring layer.

5. A method of manufacturing a wiring structure for connecting a plurality of first electrical contacts to respective ones of a plurality of second electrical contacts, the plurality of first electrical contacts being arranged in a first straight line over a first span, the plurality of second electrical contacts being arranged in a second straight line over a second span, the first straight line is parallel to the second straight line and the second span being less than the first span, the method comprising:
    forming in a first wiring layer a plurality of first connection lines that extend respectively from first ones of the plurality of first electrical contacts to first ones of the plurality of second electrical contacts, wherein the first connection lines do not intersect each other; and
    forming in a second wiring layer a plurality of second connection lines that extend respectively from second ones of the plurality of first electrical contacts to second ones of the plurality of second electrical contacts, wherein the second connection lines do not intersect each other,
    wherein an orthographic projection of any one of the first connection lines onto a plane parallel to the first and second wiring layers does not intersect an orthographic projection of any one of the second connection lines onto the plane,
    wherein the plurality of first connection lines and the plurality of second connection lines are arranged such that the first connection lines and the second connection lines alternate with each other when viewed from a direction perpendicular to the first and second wiring layers, and
    wherein the first and second connection lines that alternate with each other are divided into a plurality of first groups configured to transfer a first type of signals and a plurality of second groups configured to transfer a second type of signals, and the first groups and the second groups alternate with each other,
    wherein the plurality of first groups each comprise at least one of the first connection lines and at least one of the second connection lines, and the plurality of the second groups each comprise at least one of the first connection lines and at least one of the second connection lines, or
    wherein the plurality of first groups each comprise at least one of the first connection lines and at least one of the second connection lines, and the plurality of second groups each comprise a respective one of the first connection lines or the second connection lines.

6. A display device comprising:
    a wiring structure for connecting a plurality of first electrical contacts to respective ones of a plurality of second electrical contacts, wherein the plurality of first electrical contacts are arranged in a first straight line over a first span, the plurality of second electrical contacts are arranged in a second straight line over a second span, the first straight line is parallel to the second straight line and the second span is less than the first span, and the wiring structure comprises:
    a plurality of first connection lines in a first wiring layer, wherein the plurality of first connection lines extend respectively from first ones of the plurality of first electrical contacts to first ones of the plurality of second electrical contacts and do not intersect each other; and a plurality of second connection lines in a second wiring layer, wherein the plurality of second connection lines extend respectively from second ones of the plurality of first electrical contacts to second ones of the plurality of second electrical contacts and do not intersect each other, wherein an orthographic projection of any one of the first connection lines onto a plane parallel to the first and second wiring layers does not intersect an orthographic projection of any one of the second connection lines onto the plane, wherein the plurality of first connection lines and the plurality of second connection lines are arranged such that the first connection lines and the second connection lines alternate with each other when viewed from a direction perpendicular to the first and second wiring layers, and wherein the first and second connection lines that alternate with each other are divided into a plurality of first groups configured to transfer a first type of signals and a plurality of second groups configured to transfer a second type of signals, and the first groups and the second groups alternate with each other, wherein the plurality of first groups each comprise at least one of the first connection lines and at least one of the second connection lines, and the plurality of the second groups each comprise at least one of the first connection lines and at least one of the second connection lines, or wherein the plurality of first groups each comprise at least one of the first connection lines and at least one of the second connection lines, and the plurality of second groups each comprise a respective one of the first connection lines or the second connection lines.

7. The display device of claim 6, further comprising:
a touch display panel comprising touch signal lines and display signal lines; and
a driver integrated with a touch driving circuit and a display driving circuit, wherein the driver comprises a bonding area and a plurality of first pins and a plurality of second pins in the bonding area, the first pins are configured to supply display signals, the second pins are configured to supply touch signals, and the first pins and the second pins are arranged in a straight line in the bonding area,
wherein the display signal lines are connected to the first pins via the wiring structure, and
wherein the touch signal lines are connected to the second pins via the wiring structure.

8. The display device of claim 7, further comprising a glass substrate carrying the driver.

9. The display device of claim 7, further comprising a thin film substrate carrying the driver.

10. The display device of claim 7, wherein the touch display panel comprises a self-capacitive touch display panel.

11. The display device of claim 7, wherein the touch display panel comprises a mutual capacitive touch display panel.

12. The display device of claim 6, further comprising an insulating layer between the first wiring layer and the second wiring layer.

* * * * *